United States Patent [19]

Margraf

[11] 4,415,343
[45] Nov. 15, 1983

[54] SEALING SYSTEMS FOR FILTER BAGS

[76] Inventor: Adolf Margraf, Am Schleplingsbach 46, D-3060 Stadthagen, Fed. Rep. of Germany

[21] Appl. No.: 396,787

[22] Filed: Jul. 9, 1982

[30] Foreign Application Priority Data

Jul. 15, 1981 [DE] Fed. Rep. of Germany ....... 3127926

[51] Int. Cl.$^3$ .............................................. B01D 46/02
[52] U.S. Cl. ................................ 55/379; 55/341 HM; 55/294; 55/509
[58] Field of Search ................ 55/378, 379, 294, 502, 55/341 HM, 509

[56] References Cited

U.S. PATENT DOCUMENTS 4,157,900  6/1979  Margraf .............................. 55/379

FOREIGN PATENT DOCUMENTS 2738942  3/1979  Fed. Rep. of Germany ........ 55/379

*Primary Examiner*—Bernard Nozick
*Attorney, Agent, or Firm*—Balogh, Osann, Kramer, Dvorak, Genova & Traub

[57] ABSTRACT

This invention relates to the sealing of the aperture rims of cross-sectionally shallowly oval filter bags at the clean gas side of a partition dividing the filter housing into dust gas and clean gas spaces and provided with perforations. Use is made for sealing purposes of a clamping frame placing the aperture rim of each filter bag in contact with the partition at the clean gas side, which is overbridged together with the corresponding partition perforation by a twistable bridging element connected to the clamping frame, at the dust gas side, which bridging element may be placed in resilient contact with the dust gas side of the partition via the bridging element ends and through bulging filter bag portions by means of a spring system bearing on the clamping frame.

1 Claim, 5 Drawing Figures

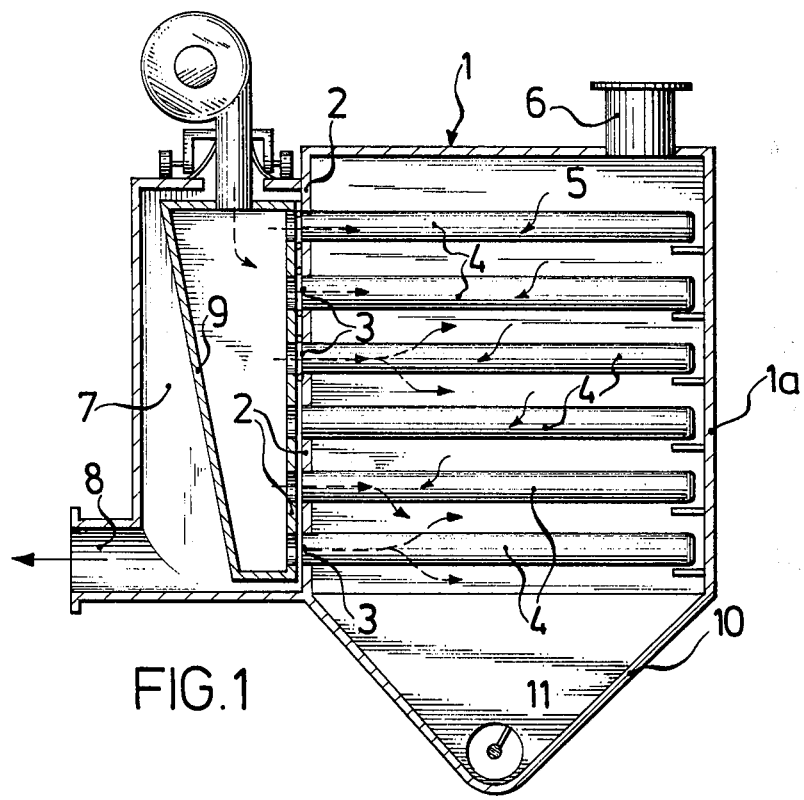
FIG.1
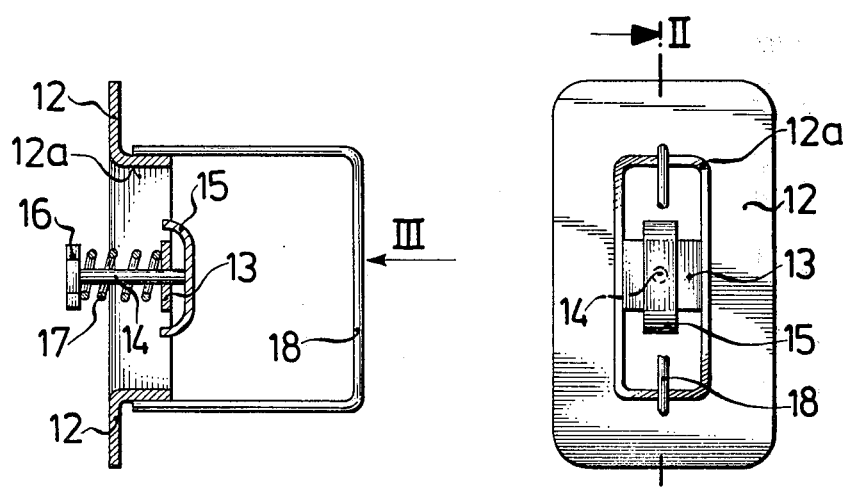
FIG.2
FIG.3

SEALING SYSTEMS FOR FILTER BAGS

BACKGROUND OF THE INVENTION

The present invention relates to a sealing system for the aperture rims of cross-sectionally shallowly oval filter bags which are to be cleansed by counterflow scavenging and/or shaking, situated at the clean gas side of a partition subdividing the casing of a bag filter into a dedusting space and a pure gas space and provided with shallowly oval perforations, in each case by means of a shallowly oval transversely overbridged clamping frame springily enclamping the filter bag aperture rim between itself and the partition, the bridging element of which bears the thrust of the spring system which on the other hand bears under loading against the dust gas side of the partition, the filter bags inserted into the dedusting space via the perforations and supported at the free end having a rigid internal spacing element terminating before the partition, which is supported in front of the partition by parts of the clamping frame. Hereinafter such a system will be referred to as "of the kind described."

Known sealing systems for the filter bag aperture rim of the kind described are exemplfied by German Specification No. OS 30 06 823, are so formed that the overbridging element of the clamping frame is connected to the one extremity of a traction spring directed towards the dust gas side, the other end of which is joined to a sleeve which bears on the bridging element in the idle position, and the axial displacement of which places the spring system under tractive stress, the latter then being borne via angle sections on the partition at either side of the partition perforation at the dust gas side by being turned through 90°, the filter bag being enlarged or expanded a little in the area of the angle sections, so that the angle sections bear on the partition via the two lateral bag enlargements.

It is an object of the invention to simplify the construction of the spring-loaded sealing system for the bag aperture rim.

SUMMARY OF THE INVENTION

Thus, in a sealing system of the kind described, the invention consists in that spindle traversing a drilling of the bridging element of each clamping frame in rotatable and longitudinally displaceable manner is firmly joined to a clamping strap at the dust gas side of the bridging element, the length of which is greater than the lateral width of the shallowly oval partition perforation, and is surrounded at the clean gas side by a compression spring situated between the bridging element and a spindle stop, which may be placed under stress by axial displacement of the spindle.

This construction renders it possible for each filter bag comprising a rigid internal spacing element to be manipulated together with the clamping frame and to be inserted through a partition perforation into the dust gas space, whilst at the same time supporting the free end of the filter element and placing the clamping frame with the aperture rim or aperture roll of the bag in contact with the partition. It is then merely necessary to grip the spindle by means of a tool at the clean gas side and to press the same in the direction towards the dust gas space and then to twist the same through 90°, so that the extremities of the clamping strap may thereby be supported against the dust gas side of the partition under slight bulging of the filter bag, as soon as the axial inward thrust displacement of the spindle is stopped.

BRIEF DESCRIPTION OF THE DRAWINGS

In order that the invention may be more clearly understood reference will now be made to the accompanying drawings which show one embodiment thereof by way of example only and in which:

FIG. 1 shows a diagrammatical vertical cross-section through a bag filter without illustrating the bag aperture rings which are to be sealed, FIG. 2 shows a vertical cross-section through the clamping frame according to the invention along the line II to II of FIG. 3, FIG. 3 shows an elevation corresponding to FIG. 2, as seen in the direction of the arrow III.

DETAILED DESCRIPTION OF THE PREFERRED EMBODIMENT

Figure 4:
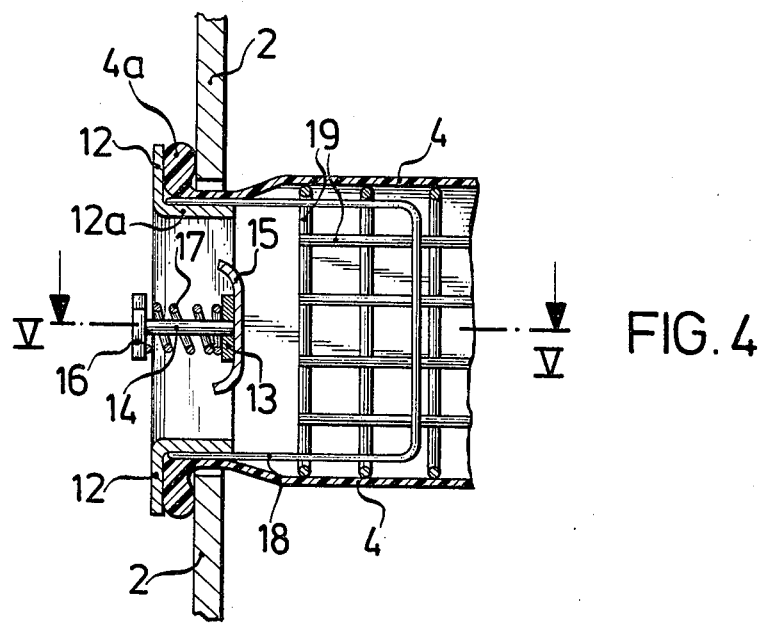
FIG. 4 shows a partial vertical cross-section of a filter bag or filter element fitted with the clamping frame, which is to be inserted into the dust gas space.

Referring now to the drawings in the embodiment shown, the bag filter housing 1 is subdivided by a partition having parallel rows of shallowly oval perforations 3 into a dedusting space 5 receiving the filter bags 4 and comprising a dust gas feed 6, and a clean gas space 7 having a clean gas offtake 8. A slotted nozzle 9 may periodically be displaced back and forth along the rows of slots 3 for counterflow scavenging of the bags with clean air or compressed air, or a periodically switchable compressed gas nozzle is allocated to each filter bag 4.

The free ends of the filter bags 4 are supported in any desired manner on the rear wall 1a of the housing, within the dust gas space 5, and a dust collector space 10 having a dust gas outlet 11 is situated below the filter bags 4.

The advantageously beaded aperture rim 4a of the bags 4 is to be sealed resiliently on the partition 2 at the clean gas side 7. To this end, a clamping frame 12 as shown in FIGS. 2 and 3 is utilised, comprising a flange 12a passing through the perforations 3 and which is provided with a transversely extending bridging element 13. This bridging element 13 is perforated and a spindle 14 passes loosely through this perforation so that it can be twisted therein. This spindle 14 is firmly joined to a clamping strap 15 at one end at the dust gas side of the bridging element 13, and is provided at its other end, at the clean gas side 7, with a stop 16 which can be gripped by a tool. The spindle 14 is surrounded between the bridging element 13 and the stop 16 by a coil spring free of stress in the idle position. The length of the clamping strap 15 is a little greater than the transversely extending width of the shallowly oval wall perforations 3. The flange 12a of the clamping frame 12 is firmly joined to a supporting stirrup or bail 18 at the upper and lower extremities.

The clamping frame 12 described above is inserted into the open end of the filter bags 4 provided with a rigid internal spacing element 19 terminating before the partition 2 and for example comprising longitudinal and transverse wires, for assembling purposes, in such manner that the supporting stirrup or bail 18 engages in the end directed towards the partition 2 of the rigid spacing element 19. This assembly is inserted through a partition perforation 3 into the dust gas space 5 until the free end is supported, and the aperture rim 4a of the bag then fits loosely with the clamping frame 12 against the partition 2 at the clean gas side 7. Upon inserting the filter bags into the dust gas space, the clamping strap 15 is positioned in the direction of the greater diameter of the partition perforation 2 or of the correspondingly profiled filter bag 4.

Figure 5:
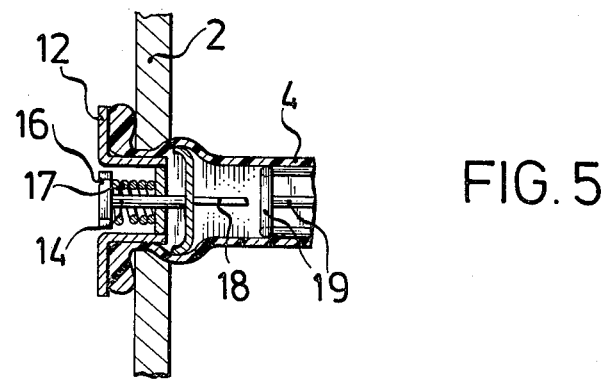
FIG. 5 shows a cross-section along the line V to V of FIG. 4, after the spring-loaded sealing of the bag aperture rim has been established by means of the clamping frame.

The spindle stop 16 is thereupon gripped with a tool and then pressed axially in the direction towards the dust gas space 5 whilst loading the compression spring 17, and is then turned through 90°, so that the clamping strap 15 bears against the dust gas side of the partition 2 under spring loading after releasing the pressure, and in doing so enclamps two somewhat bulging parts of the filter bag 4 as shown in FIG. 5. The installation and sealing of each filter element are completed in this manner.

I claim:

1. In a sealing system for the aperture rims of cross-sectionally shallowly oval filter bags which are to be cleansed by counterflow scavenging and/or shaking, situated at the clean gas side of a partition subdividing the casing of a bag filter into a dedusting space and a pure gas space and provided with shallowly oval perforations, in each case by means of a shallowly oval transversely overbridged clamping frame springily enclamping the filter bag aperture rim between itself and the partition, the bridging element of which bears the thrust of the spring system which on the other hand bears under loading against said dust gas side of said partition, said filter bags inserted into said dedusting space via said perforations and each supported at its free end and having a rigid internal spacing element terminating before said partition, and which is supported in front of said partition by parts of said clamping frame, the invention which consists in that a spindle passes through an aperture in said bridging element of each said clamping frame in rotatable and longitudinally displaceable manner said spindle being firmly joined at said dust gas side of said bridging element with a clamping strap the length of which is greater than the lateral width of said shallowly oval partition perforation and is surrounded at said clean gas side by a compression spring which is situated between said bridging element and a spindle stop, said clamping strap being placeable under stress by axial displacement of said spindle.

* * * * *